United States Patent
Iwatsuki et al.

(10) Patent No.: US 7,806,790 B2
(45) Date of Patent: Oct. 5, 2010

(54) SLIPPAGE DETECTION SYSTEM AND METHOD FOR CONTINUOUSLY VARIABLE TRANSMISSIONS

(75) Inventors: Kunihiro Iwatsuki, Aichi-ken (JP);
Kazumi Hoshiya, Aichi-ken (JP);
Yasuhiro Oshiumi, Aichi-ken (JP);
Yasunori Nakawaki, Aichi-ken (JP);
Masataka Osawa, Aichi-ken (JP);
Hiroyuki Nishizawa, Aichi-ken (JP);
Hiroyuki Yamaguchi, Aichi-ken (JP);
Hideyuki Suzuki, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1764 days.

(21) Appl. No.: 10/491,042

(22) PCT Filed: Sep. 30, 2002

(86) PCT No.: PCT/IB02/04001

§ 371 (c)(1),
(2), (4) Date: Aug. 11, 2005

(87) PCT Pub. No.: WO03/027540

PCT Pub. Date: Apr. 3, 2003

(65) Prior Publication Data

US 2006/0183581 A1    Aug. 17, 2006

(30) Foreign Application Priority Data

Sep. 28, 2001  (JP) .............................. 2001-302181

(51) Int. Cl.
*F16H 55/56* (2006.01)
*B60K 26/00* (2006.01)

(52) U.S. Cl. ............................. 474/12; 474/11; 474/18; 474/45; 477/44; 477/45; 477/140; 477/156; 477/176; 477/186; 701/51; 701/69; 701/87; 701/90

(58) Field of Classification Search .................... 474/12, 474/8, 45; 701/70, 80, 84; 477/45
See application file for complete search history.

(56) References Cited

U.S. PATENT DOCUMENTS 4,253,414 A * 3/1981 Schafer ........................ 440/84
4,619,629 A * 10/1986 Shigematsu et al. ........... 474/28
5,351,192 A * 9/1994 Tsuyama et al. .............. 701/84

(Continued)

FOREIGN PATENT DOCUMENTS

DE    43 12 745    10/1994

(Continued)

*Primary Examiner*—Robert A Siconolfi
*Assistant Examiner*—San Aung
(74) *Attorney, Agent, or Firm*—Oblon, Spivak, McClelland, Maier & Neustadt, L.L.P.

(57) ABSTRACT

A slippage detection system for a continuously variable transmission capable of continuously changing a ratio between a speed of rotation of an input member and a speed of rotation of an output member is provided. The slippage detection system calculates a correlation coefficient relating to the input rotation speed and the output rotation speed, based on a plurality of measurement values of the input rotation speed and a plurality of measurement values of the output rotation speed, and determines slippage of the torque transmitting member in the continuously variable transmission based on the calculated correlation coefficient.

4 Claims, 13 Drawing Sheets

U.S. PATENT DOCUMENTS

| | | |
|---|---|---|
| 5,643,116 A | 7/1997 | Genzel et al. |
| 5,865,707 A * | 2/1999 | Shimada et al. ............... 477/44 |
| 6,193,630 B1 * | 2/2001 | Janasek et al. ............. 477/156 |
| 6,283,893 B1 * | 9/2001 | Fritzner et al. ............. 477/176 |
| 6,370,468 B1 * | 4/2002 | Koga et al. .................... 701/91 |
| 6,428,445 B1 * | 8/2002 | Friedmann et al. ........... 477/44 |
| 2001/0002549 A1 | 6/2001 | Reuschel |
| 2005/0192131 A1 * | 9/2005 | Yamamoto et al. ............ 474/18 |

FOREIGN PATENT DOCUMENTS

| | | |
|---|---|---|
| DE | 199 59 470 | 6/2000 |
| DE | 199 37 472 | 11/2000 |
| DE | 100 50 218 | 4/2002 |
| DE | 100 59 450 | 6/2002 |
| JP | 62 002059 | 1/1987 |

* cited by examiner

SLIPPAGE DETECTION SYSTEM AND METHOD FOR CONTINUOUSLY VARIABLE TRANSMISSIONS

BACKGROUND OF THE INVENTION

1. Field of Invention

The invention relates to a slippage detection system and method for use in a continuously variable transmission capable of continuously changing the gear ratio that is a ratio between an input rotation speed and an output rotation speed of the CVT.

2. Description of Related Art

As a continuously variable transmission capable of changing the gear ratio continuously, a belt-type continuously variable transmission and a toroidal type (traction-type) continuously variable transmission are known in the art. The belt-type continuously variable transmission is adapted to transmit torque and change the gear ratio by using a belt, and the toroidal type continuously variable transmission is adapted to transmit torque and change the gear ratio by using a power roller. In the belt-type continuously variable transmission, the belt is wound around drive and driven pulleys each capable of changing a groove width, and torque is transmitted by use of frictional force between contact surfaces of the pulleys and the belt. With this arrangement, the gear ratio of the CVT is changed by changing the groove width of the drive pulley so as to change an effective radius of the belt wound around the pulley.

In a toroidal continuously variable transmission, on the other hand, a power roller is sandwiched between an input disk and an output disk, and torque is transmitted by use of shearing force of traction oil present between the power roller and each of the disks. With this arrangement, the gear ratio of the CVT is changed by slanting or inclining the rotating power roller to thereby change the radius of the position at which torque is transmitted between the power roller and each disk. In the continuously variable transmission of the above types, a torque transmission portion takes the form of a surface, namely, torque is transmitted via surfaces of mutually facing members, so that the gear ratio can be continuously changed.

As a power transmitting mechanism that transmits torque via surfaces, a friction clutch, a friction brake, and the like are known. Such a friction clutch or a friction brake is constructed such that the entire areas of frictional surfaces come in contact with and are spaced apart from each other, with the frictional surfaces being designed in view of wears. A continuously variable transmission, on the other hand, is constructed so as to transmit torque by bringing a belt or a power roller into contact with a portion of a torque transmitting surface of each pulley or disk while continuously changing the torque transmitting portion. In such a continuously variable transmission, the torque transmitting surface is designed without substantially allowing for wear, and therefore a local wear of the torque transmitting surface may result in poor torque transmission or a damage to the continuously variable transmission.

Besides, there is a limit to the strength of constituent members or elements of the CVT, such as the belt, pulleys, disks, and traction oil. Therefore, the contact pressure between the corresponding members cannot be increased without limit to avoid slippage of the continuously variable transmission. Furthermore, when the contact pressure is increased to a certain level, the efficiency of power transmission and the durability of the continuously variable transmission may be undesirably reduced.

In continuously variable transmissions, therefore, the clamping force for clamping the belt or the power roller (or the load applied to clamp the belt or the power roller) is desired to be set to the minimum value in a range that ensures that excessive slippage (so-called macro-slip) does not occur between the belt and the corresponding pulley or between the power roller and the corresponding disk. Nevertheless, in general, the torque applied to the continuously variable transmission continuously changes. Especially when a vehicle in which a continuously variable transmission is used goes through a sudden acceleration or brake, or is brought into a complicated operating state, such as temporary idling or slippage of drive wheels, a sudden and temporarily large torque may be applied to the continuously variable transmission.

If the clamping force is set to be a greater value in preparation for such temporarily large torque, the power transmitting efficiency and the fuel efficiency may deteriorate while the vehicle is running in normal or steady-state conditions. Accordingly, it is preferable to perform a control to increase the clamping force or reduce the torque applied to the CVT when slippage due to large torque as described above is actually detected.

In the meantime, a system adapted for detecting a condition caused by slippage in a continuously variable transmission has been proposed in Japanese Laid-open Patent Publication No.62-2059. The system disclosed in this publication is arranged to determine a failure or problem in the continuously variable transmission. In this system, rotation speeds of a main pulley and a sub-pulley are measured using sensors to calculate a gear ratio. If the gear ratio thus measured or the rate of change in the gear ratio exhibits an extreme value that is not obtained in normal state, the system is determined to be at faulty.

The sensors used in the system disclosed in the above publication are the same as or equivalent to sensors generally used for a gear ratio control of a continuously variable transmission. With the above system thus constructed, therefore, a failure or a problem in the continuously variable transmission can be detected without using other sensor(s) newly provided for this purpose. Thus, the system disclosed in the above publication is designed for determining a failure of the continuously variable transmission, but is not provided, by nature, with any function of dealing with excessive slippage of the belt.

That is, the system disclosed in the above publication is constructed so as to detect a failure of the continuously variable transmission for the first time when the gear ratio or the rate of change in the gear ratio takes an abnormal value as a result of excessive slippage of the belt. The system, therefore, cannot be used for the purpose of avoiding a problem caused by excessive slippage of the belt. In other words, the system disclosed in the above publication is not able to detect, with sufficiently high speed and accuracy, the beginning of a so-called macro-slip (i.e., considerably large slip) of the belt or a state that may lead to a macro-slip. Consequently, the above-described conventional system cannot be used as a slippage detection system for performing a control for dealing with temporary slippage of the belt in the continuously variable transmission.

SUMMARY OF THE INVENTION

It is therefore an object of the invention to provide a system capable of immediately and accurately detecting slippage of a belt, or the like, in a continuously variable transmission, or detecting a start of slippage or a state that may lead to slippage, without a dedicated sensor or sensors.

To accomplish the above object, there is provided according to the invention a slippage detection system for a continuously variable transmission having an input member, an output member and a torque transmitting member for transmitting torque between the input member and the output member, the continuously variable transmission being capable of continuously changing a ratio between an input rotation speed of the input member and an output rotation speed of the output member. The slippage detection system includes (a) correlation coefficient calculating means for calculating a correlation coefficient relating to the input rotation speed and the output rotation speed, based on a plurality of measurement values of the input rotation speed and a plurality of measurement values of the output rotation speed, and (b) slippage determining means for determining slippage of the torque transmitting member in the continuously variable transmission based on the correlation coefficient calculated by the correlation coefficient calculating means.

The slippage in the continuously variable transmission may be considered as a state or condition in which the relationship between the input-side rotation speed and the output-side rotation speed deviates from a predetermined one that corresponds to a gear ratio (i.e., the ratio of the output-side rotation speed to the input-side rotation speed) to be established. The slippage detection system as described above calculates a correlation coefficients that represents the relationship between the input rotation speed and the output rotation speed, and is therefore able to immediately and accurately determine a slipping state of the CVT, or a state that leads to excessive slippage, or a start of excessive slippage.

In one preferred embodiment of the invention, the slippage determining means determines slippage of the torque transmitting member in the continuously variable transmission when the correlation coefficient calculated by the correlation coefficient calculating means is smaller than a predetermined reference value. The reference value may be set based on an operating state of a vehicle in which the continuously variable transmission is installed.

By setting the reference value to an appropriate value, the slippage detection system is able to determine even a small degree of slippage as well as large slippage, and perform suitable control to deal with the slippage. At the same time, the slippage detection system can avoid excessively sensitive determination of slippage which would lead to unnecessary control for dealing with the slippage.

In another embodiment of the invention, the correlation coefficient calculating means calculates the correlation coefficient when the operating state of the vehicle in which the continuously variable transmission is installed satisfies at least one predetermined condition. With this arrangement, even if the running state of the vehicle changes in a complicated manner, calculation of the correction coefficient is carried out only when the vehicle is in a suitable running state. It is thus possible to accurately determine a slipping state in the continuously variable transmission.

In a further embodiment of the invention, the correlation coefficient calculating means sets the number of the measurement values of each of the input rotation speed and the output rotation speed used for calculating the correlation coefficient, based on an operating state of a vehicle in which the continuously variable transmission is installed.

The above arrangement makes it possible to avoid erroneous determination of slippage in the continuously variable transmission, or avoid a situation in which calculation of the correlation coefficient is unnecessarily repeated even if the running state of the vehicle does not change.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Figure 14:
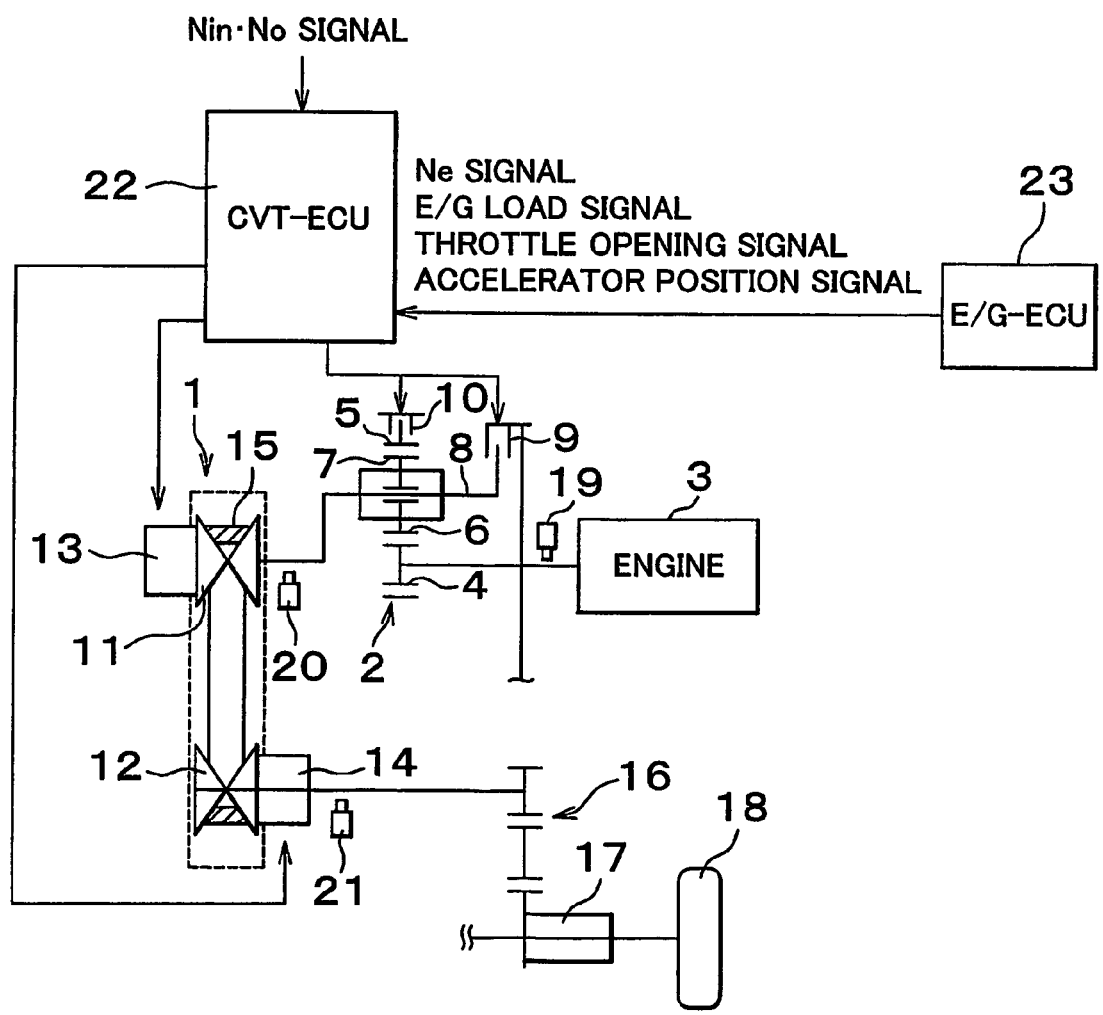
FIG. 14 is a view schematically showing a drive system and a control system of a vehicle with a continuously variable transmission in which a slippage detection system according to the invention is employed.

Some exemplary embodiments of the invention will be described in detail. First, a drive system and a control system of a motor vehicle to which the invention is applied will be described with reference to FIG. 14. FIG. 14 schematically shows a drive system including a belt-type continuously variable transmission (CVT) 1 as a transmission. The CVT 1 is coupled to a power source 3 via a forward/reverse-drive switching mechanism 2.

The power source 3 is a drive unit for generating power to run the vehicle, and is provided by an internal combustion engine, a combination of an internal combustion engine and an electric motor, an electric motor, or the like. In this embodiment, the power source 3 takes the form of an engine. The forward/reverse-drive switching mechanism 2 is employed since the engine 3 can rotate only in one direction, and is arranged to output the input torque as it is or in a reverse direction.

In the example shown in FIG. 14, a double-pinion type planetary gear mechanism is used as the forward/reverse-drive switching mechanism 2. In this mechanism, a ring gear 5 is disposed concentrically with a sun gear 4, and a pinion gear 6 that engages with the sun gear 4 and another pinion gear 7 that engages with the pinion gear 6 and the ring gear 5 are disposed between the sun gear 4 and the ring gear 5. The pinion gears 6, 7 are supported by a carrier 8 such that these gears 6, 7 are freely rotatable about their center axes and about the center axis of the planetary gear mechanism. A forward-drive clutch 9 is provided for coupling two rotating elements (i.e., sun gear 4 and carrier 8) into one unit. Also, a reverse-drive brake 10 is provided for reversing the direction of torque output from the forward/reverse-drive switching mechanism 2 by fixing the ring gear 5 selectively.

The construction of the CVT 1 is the same as or equivalent to that of a known belt-type continuously variable transmission. The CVT 1 is provided with a drive pulley 11 and a driven pulley 12, which are arranged in parallel to each other. Each of the pulleys 11 and 12 principally consists of a stationary sheave and a movable sheave that is adapted to be moved forward and backward in an axial direction thereof by a hydraulic actuator 13 or 14. With this arrangement, the groove width of each of the pulleys 11, 12 changes as the movable sheave of the pulley is moved in the axial direction thereof, thus continuously changing the winding radius of the belt 15 wound around the pulleys 11, 12 (i.e., the effective radius of each pulley 11, 12) thereby to continuously change the gear ratio of the CVT 1. The drive pulley 11 is connected to the carrier 8 serving as an output element of the forward/reverse-drive switching mechanism 2.

A hydraulic pressure (a line pressure or its corrected pressure) is applied to the hydraulic actuator 14 for the driven pulley 12 via a hydraulic pump and a hydraulic control device or system (not shown). The level of the hydraulic pressure applied to the hydraulic actuator 14 is controlled to be commensurate with the magnitude of the torque received by the CVT 1. With this arrangement, the belt 15 is clamped or gripped between the sheaves of the driven pulley 12 and is thus provided with suitable tensile force, so that a suitable clamping force (or contact pressure) surely appears between each of the pulleys 11, 12 and the belt 15. On the other hand, the hydraulic actuator 14 of the drive pulley 11 is supplied with an oil pressure that depends on a desired gear ratio, thereby setting the groove width (or pitch diameter) of the pulley 11 to a target value.

The driven pulley 12 is connected to a differential gear unit 17 via a pair of gears 16, and is adapted to output a torque to drive wheels 18 via the differential gear unit 17.

Various sensors are provided for detecting operating conditions (or running conditions) of the vehicle including the CVT 1 and the engine 3. More specifically, there are provided an engine speed sensor 19 for measuring the rotation speed of the engine 3 and generating a signal indicative of the engine speed, an input rotation speed sensor 20 for measuring the rotation speed of the drive pulley 11 and generating a signal indicative of the input rotation speed, and an output rotation speed sensor 21 for measuring the rotation speed of the driven pulley 12 and generating a signal indicative of the output rotation speed. In addition, an accelerator position sensor, a throttle opening sensor, a brake sensor, and other sensors are provided, though not shown in the figure. The accelerator position sensor is arranged to measure the amount of depression of an accelerator pedal and output a signal indicative of the accelerator pedal position. The throttle opening sensor is arranged to measure the opening amount of the throttle valve and output a signal indicative of the throttle opening. The brake sensor is arranged to output a signal when a brake pedal is depressed.

Also, an electronic control unit (CVT-ECU) 22 for transmission is provided for controlling engagement and release of each of the forward-drive clutch 9 and the reverse-drive brake 10, the clamping force applied to the belt 15, and the gear ratio of the CVT 1. The electronic control unit 22 for transmission includes, for example, a microcomputer as its main component, and is arranged to perform calculations based on input data and data stored in advance, thereby to perform controls such as establishment of a selected operating mode, such as forward-drive, revere-drive or neutral mode, setting of the required clamping pressure, and setting of the gear ratio of the CVT 1.

Input data (or signals) received by the electronic control unit 22 for transmission may include, for example, signals indicative of input-shaft rotation speed Nin and output rotation speed No of the CVT 1 received from corresponding sensors (not shown). In addition, the electronic control unit 22 for transmission receives signals indicative of engine speed Ne, engine (E/G) load, throttle opening, accelerator position that represents the amount of depression of the accelerator pedal (not shown) and so on, from an electronic control unit (E/G-ECU) 23 for controlling the engine 3.

The CVT 1 is capable of continuously or steplessly controlling the engine speed as the input rotation speed as described above. When the CVT 1 is installed on a motor vehicle, therefore, the fuel efficiency of the vehicle is improved. For example, a target driving force is determined based on the required driving amount as represented by the accelerator pedal position, or the like, and the vehicle speed. Then, a target output of the CVT 1 needed for achieving the target driving force is determined based on the target driving force and the vehicle speed. Then, an engine speed for achieving the target output with the optimum fuel efficiency is determined using a predetermined map. Finally, the gear ratio of the CVT 1 is controlled so as to achieve the determined engine speed.

To make advantage of the improvement in the fuel efficiency, the power transmitting efficiency of the CVT 1 is controlled to a desirably high level. More specifically, the torque capacity or the belt clamping pressure of the CVT 1 is controlled to be the minimum value in a range in which the CVT 1 can transmit the target torque determined based on the engine torque without causing slippage of the belt 15. This control is normally performed in a steady state in which the vehicle speed and the output requirement hardly change or in an almost steady state in which one or both of these parameters slightly changes.

Meanwhile, if the vehicle is suddenly braked or accelerated or if the vehicle runs upon a dropped object or a step, the torque applied to the drive system including the CVT 1 suddenly changes. In this case, the torque capacity of the CVT 1 may become relatively insufficient, thus increasing the possibility of slippage of the belt 15. In such a case, therefore, the control system of the embodiment performs so-called reactive control to temporarily increase the belt clamping force or temporarily reduce the engine torque. The control system of the embodiment is arranged to perform the following control so as to judge or determine occurrence of a situation (i.e., macro-slip) that requires the reactive control as described above.

Figure 1:
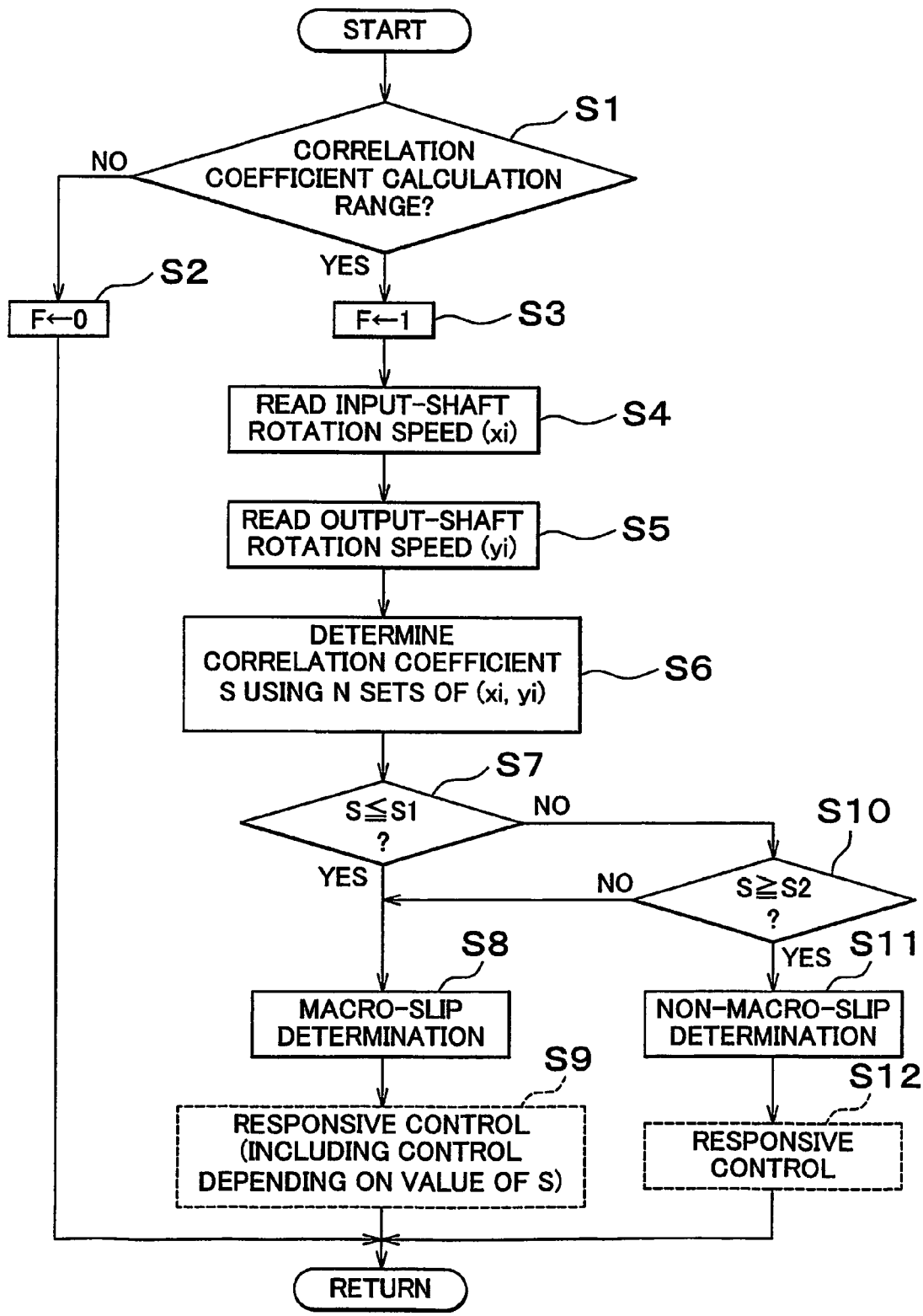
FIG. 1 is a flowchart for explaining one example of control performed by a controller of a slippage detection system according to one embodiment of the invention.

FIG. 1 is a flowchart showing one example of the control for determining a macro-slip of the belt 15 of the CVT 1. In this control, a correlation coefficient obtained based on the input and output rotation speeds is used. As shown in FIG. 1, it is first determined in step S1 whether the running state of the vehicle is within a calculation range of the correlation coefficient. The correlation coefficient used in this control is a coefficient calculated based on the input-shaft rotation speed (xi) and the output-shaft rotation speed (yi). When each of the input and output rotation speeds has a value other than 0 and the gear ratio is kept almost constant, the running state of the vehicle is determined to be within the calculation range of the correlation coefficient. That is, the correlation coefficient is within the calculation range when the vehicle is running while the gear ratio is kept almost constant (i.e., the speed ratio, which is the inverse of the gear ratio, is kept almost constant).

If a negative determination is made in step S1, a flag F is reset to 0 in step S2 and the control returns. If a positive determination is made in step S1, on the other hand, the flag F is set to 1 in step S3 and the input-shaft rotation speed (xi) and the output-shaft rotation speed (yi) are read in steps S4 and S5, respectively. These rotation speeds (xi, yi) are respectively measured by the input rotation speed sensor 20 and the output rotation speed sensor 21 shown in FIG. 14. In step S6, a correlation coefficient S is obtained using N sets of the rotation speeds (xi, yi) that have been read so far.

The correlation coefficient S is represented by the expression (1) below:

$$\frac{\text{correlation}}{\text{coefficient } S} = \frac{x_1 \cdot y_1 + x_2 \cdot y_2 + \ldots + x_n \cdot y_n}{\sqrt{x_1^2 + x_2^2 + \ldots + x_n^2} \sqrt{y_1^2 + y_2^2 + \ldots + y_n^2}} \quad (1)$$

In the above expression (1), each suffix (1, 2 ... n) represents a sampling point at which the rotation speed (xi or yi) was measured and n represents the present time.

An occurrence or possibility of slippage (macro-slip) of the belt is determined by using the correlation coefficient S in the following manner. In the expression (1), the power of the rotation speeds of the input and output members (i.e., the input and output shafts of the CVT 1) is normalized by the square root of the powers of the input rotation speed and the output rotation speed. According to the expression (1), when the power of the input and output rotation speeds decreases, the normalized value decreases. More specifically, when slippage of the belt 15 does not occur, the correlation coefficient S is equal to 1. When slippage of the belt 15 occurs, conversely, the value becomes smaller than 1.

Thus, while the belt 15 is not slipping but is being gripped by the drive and driven pulleys 11, 12, the relationship as represented by expression (2) below is true:

$$yi = \gamma \cdot xi \quad (2)$$

Here, γ represents the speed ratio (which is the inverse of the gear ratio).

When the expression (2) is assigned to the above expression (1), the correlation coefficient S is represented by expression (3), and its value becomes 1.

$$\frac{\text{correlation}}{\text{coefficient } S} = \frac{\gamma \cdot (x_1 \cdot x_1 + x_2 \cdot x_2 + \ldots + x_n \cdot x_n)}{\sqrt{x_1^2 + x_2^2 + \ldots x_n^2} \sqrt{\gamma^2 \cdot (x_1^2 + x_2^2 + \ldots x_n^2)}} \quad (3)$$

$$= \frac{\gamma \cdot (x_1^2 + x_2^2 + \ldots + x_n^2)}{\gamma \cdot (x_1^2 + x_2^2 + \ldots + x_n^2)}$$

$$= 1.0$$

As described above, one of the conditions for the calculation is that the speed ratio γ be almost constant in order to put the speed ratio γ out of the parentheses. It is thus not preferable to measure the input-shaft and output-shaft rotation speeds at long time intervals or sampling time.

Next, there will be described the case where the belt 15 is not being sufficiently gripped by the drive and driven pulleys 11, 12 and is slipping. While the belt 15 is slipping, the relationship between the input-shaft rotation speed (xi) and the output-shaft rotation speed (yi) with respect to the speed ratio γ that is currently set becomes untrue. The relationship between these rotation speeds is then represented in expression (4) below:

$$yi = ki \cdot \gamma \cdot xi \quad (4)$$

Here, ki, which is a real number larger than "0", is a coefficient representing rotational fluctuations or variations.

In this case, the expression (4) is assigned to the above expression (1), and the correlation coefficient S is then represented by the following expression (5):

$$\frac{\text{correlation}}{\text{coefficient } S} = \frac{\gamma \cdot (k_1 \cdot x_1 \cdot x_1 + k_2 \cdot x_2 \cdot x_2 + \ldots + k_n \cdot x_n \cdot x_n)}{\sqrt{x_1^2 + x_2^2 + \ldots + x_n^2}} \quad (5)$$

$$\sqrt{\gamma^2 \cdot (k_1^2 \cdot x_1^2 + k_2^2 \cdot x_2^2 + \ldots + k_n^2 \cdot x_n^2)}$$

$$= \frac{k_1 \cdot x_1^2 + k_2 \cdot x_2^2 + \ldots + k_n \cdot x_n^2}{\sqrt{x_1^2 + x_2^2 + \ldots + x_n^2}}$$

$$\sqrt{(k_1^2 \cdot x_1^2 + k_2^2 \cdot x_2^2 + \ldots k_n^2 \cdot x_n^2)}$$

When the coefficient ki is not constant due to the rotational fluctuations caused by slippage of the belt 15, the correlation coefficient S becomes smaller than 1. Namely, the expression (5) is transformed into the following expression (6).

$$\frac{\text{correlation}}{\text{coefficient } S} = \frac{\sqrt{(k_1 \cdot x_1^2 + k_2 \cdot x_2^2 + \ldots k_n \cdot x_n^2)^2}}{\sqrt{x_1^2 + x_2^2 + \ldots + x_n^2}} \quad (6)$$

$$\sqrt{(k_1^2 \cdot x_1^2 + k_2^2 \cdot x_2^2 + \ldots + k_n^2 \cdot x_n^2)}$$

When the numerator and denominator of the expression (6) are expanded, the following expressions (7) and (8) will be provided respectively:

$$(k_1 \cdot x_1^2 + k_2 \cdot x_2^2 + \ldots + k_n \cdot x_n^2) \cdot (k_1 x_1^2 + k_2 \cdot x_2^2 + \ldots + k_n \cdot x_n^2) = \quad (7)$$
$$k_1 \cdot x_1^2 \cdot (k_1 \cdot x_1^2 + k_2 \cdot x_2^2 + \ldots + k_n \cdot x_n^2) +$$
$$k_2 \cdot x_2^2 \cdot (k_1 \cdot x_1^2 + k_2 \cdot x_2^2 + \ldots + k_n \cdot x_n^2)$$
$$\vdots +$$
$$k_n \cdot x_n^2 \cdot (k_1 \cdot x_1^2 + k_2 \cdot x_2^2 + \ldots + k_n \cdot x_n^2) =$$
$$k_1^2 \cdot x_1^4 + k_2^2 \cdot x_2^4 + \ldots + k_n^2 \cdot x_n^4 + x_1^2 \cdot (k_1 \cdot k_2 x_2^2 + \ldots + k_1 \cdot k_n \cdot x_n^2) +$$
$$x_2^2 \cdot (k_2 \cdot k_1 \cdot x_1^2 + \ldots + k_2 \cdot k_n \cdot x_n^2)$$
$$\vdots +$$
$$x_n^2 \cdot (k_n \cdot k_1 \cdot x_1^2 + \ldots + k_n \cdot k_{n-1} \cdot x_{n-1}^2)$$

-continued $$(x_1^2 + x_2^2 + \ldots + x_n^2) \cdot (k_1^2 \cdot x_1^2 + k_2^2 \cdot x_2^2 + \ldots + k_n^2 \cdot x_n^2) = \quad (8)$$
$$x_1^2 \cdot (k_1^2 \cdot x_1^2 + k_2^2 \cdot x_2^2 + \ldots + k_n^2 \cdot x_n^2)$$
$$\vdots +$$
$$x_n^2 \cdot (k_1^2 \cdot x_1^2 + k_2^2 \cdot x_2^2 + \ldots + k_n^2 \cdot x_n^2) =$$
$$k_1^2 \cdot x_1^4 + k_2^2 \cdot x_2^4 + \ldots + k_n^2 \cdot x_n^4 + x_1^2 \cdot (k_2^2 \cdot x_2^2 + \ldots + k_n^2 \cdot x_n^2) +$$
$$\vdots +$$
$$x_n^2 \cdot (k_1^2 \cdot x_1^2 + \ldots k_{n-1}^2 \cdot x_{n-1}^2)$$

If the sampling time n is 3, the expressions (7) and (8) are rewritten into the following expressions (9) and (10), respectively:

$$k_1^2 \cdot x_1^2 + k_2^2 \cdot x_2^4 + k_3^2 + \cdot x_3^4 + x_1^2 \cdot (k_1 \cdot k_2 \cdot x_2^2 + k_1 \cdot k_3 \cdot x_3^2) + \quad (9)$$
$$x_2^2 \cdot (k_2 \cdot k_1 \cdot x_1^2 + k_2 \cdot k_3 \cdot x_3^2) +$$
$$x_3^2 \cdot (k_3 \cdot k_1 \cdot x_1^2 + k_3 \cdot k_2 \cdot x_2^2) =$$
$$k_1^2 \cdot x_1^4 + k_2^2 \cdot x_2^4 + k_3^2 \cdot x_3^4 +$$
$$(2 \cdot k_1 \cdot k_2 \cdot x_1^2 \cdot x_2^2 + 2 \cdot k_1 \cdot k_3 \cdot x_1^2 \cdot x_3^2 + 2 \cdot k_2 \cdot k_3 \cdot x_2^2 \cdot x_3^2)$$

$$k_1^2 \cdot x_1^4 + k_2^2 \cdot x_2^4 + k_3^2 \cdot x_3^4 + x_1^2 \cdot (k_2^2 \cdot x_2^2 + k_3^2 \cdot x_3^2) + \quad (10)$$
$$x_2^2 \cdot (k_1^2 \cdot x_1^2 + k_3^2 \cdot x_3^2) +$$
$$x_3^2 \cdot (k_1^2 \cdot x_1^2 + k_2^2 \cdot x_2^2) =$$
$$k_1^2 \cdot x_1^4 + k_2^2 \cdot x_2^4 + k_3^2 \cdot x_3^4 +$$
$$(x_1^2 \cdot x_2^2 \cdot (k_1^2 + k_2^2) + x_1^2 \cdot x_3^2 \cdot (k_1^2 + k_3^2) + x_2^2 \cdot x_2^2 \cdot x_3^2 \cdot (k_2^2 + k_3^2))$$

When the respective coefficients affixed to $x_1^2 \cdot x_2^2$, or the like, in the expressions (9) and (10) are compared, the relationship as represented by the following expression (11) is found to be true:

$$k_j^2 + k_m^2 \geq 2 \cdot k_j \cdot k_m \quad (11)$$

Here, j and m are suffixes such as 1 and 2.

The expression (11) may be rewritten into the following expression (12):

$$(k_j - k_m)^2 \geq 0 \quad (12)$$

Here, since Ki and Km are real numbers, the relationship of the expression (12) is always true and therefore the relationship of the expression (11) is also true. Also, when the sampling number n is larger than 3, the relationships of the expressions (11) and (12) are true. When the input/output rotation speeds start varying, the value of the denominator as described above becomes larger than that of the numerator. As a result, the correlation coefficient S becomes smaller than 1. Accordingly, it is possible to determine an occurrence of slippage of the belt 15 based on the correlation coefficient S.

In step S6 of FIG. 1, the correlation coefficient S is determined through calculations. In step S7, it is determined whether the correlation coefficient S is equal to or smaller than a first reference value S1 determined in advance. The first reference value S1 is smaller than 1 and is determined in advance as a value corresponding to a state in which a macro-slip is occurring or a slipping state which may lead to a macro-slip.

If the correlation coefficient S is equal to or smaller than the first reference value S1 and a positive determination is therefore made in step S7, an occurrence or a possibility of a macro-slip is then determined (macro-slip determination is made) in step S8. In the next step S9, a responsive control is performed in response to the macro-slip determination made in step S8. In short, the responsive control is performed to avoid or suppress macro-slips. As the responsive control, for example, the clamping force applied to the belt 15 is increased or the engine torque is reduced. In addition, if a clutch is used for transmitting torque to the CVT 1, for example, the capacity of the clutch is reduced under the responsive control. The degree of the responsive control is set in accordance with the degree of the macro-slip, namely, the value of the correlation coefficient S.

Conversely, when the correlation coefficient S is larger than the first reference value S1 described above, and a negative determination is made in step S7, it is then determined in step S10 whether the correlation coefficient S is equal to or larger than a second reference value S2. The second reference value S2 is a value larger than the first reference value S1 but smaller than 1 and is determined in advance as a value that corresponds to a state where a relatively small macro-slip is occurring or a state that may lead to such a relatively small macro-slip.

When a negative determination is made in step S10, namely, when the correlation coefficient S is smaller the second reference value S2, it indicates that a relatively small macro-slip is occurring or is highly likely to occur. In such a case, therefore, the control proceeds to step S8 to make a macro-slip determination. Subsequently, the responsive control is performed in step S9.

When a negative determination is made in step S10, conversely, a non-macro-slip determination is made in step S11. The non-macro-slip determination is made when a macro-slip is not occurring or is not likely to occur, or when the belt 15 is slipping but the degree of slipping is within a permissible range. In this case, responsive control is performed as needed in step S12 in response to the non-macro-slip determination made in step S11. One example of the responsive control is a control for reducing the clamping force applied to the belt 15. This control is intended to improve the power transmitting efficiency of the CVT 1 and to minimize the hydraulic pressure supplied to the CVT 1 to thereby reduce power loss at the hydraulic pump, thus assuring improved fuel efficiency.

Figure 2:
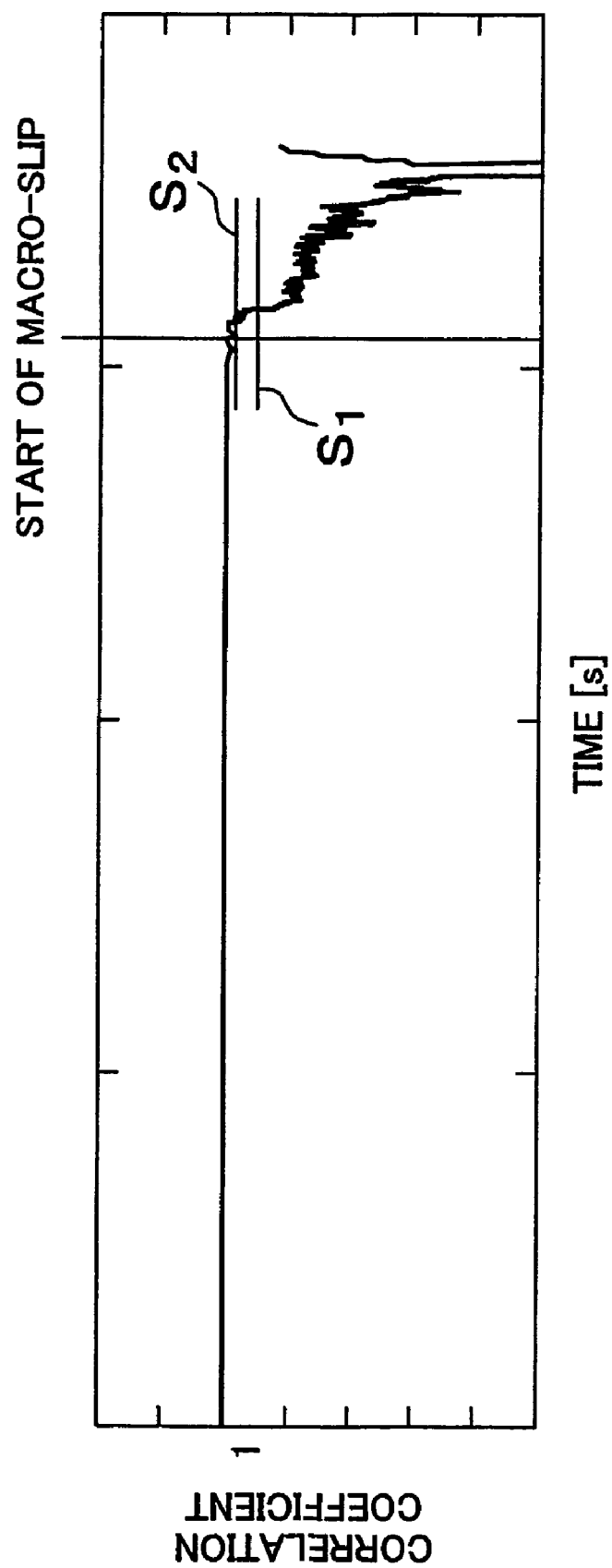
FIG. 2 is a graph showing changes in a correlation coefficient with time.

FIG. 2 is a graph showing changes in the correlation coefficient S during a transition from a state where a macro-slip of the belt 15 is not occurring to a state where a macro-slip of the belt 15 is occurring. When torque is being transmitted via the CVT 1, slippage, which can be denominated "micro-slip" in contrast to "macro-slip", unavoidably occurs. Thus, the torque is transmitted via the CVT 1 with the correlation coefficient S changing extremely slightly. When an operating state of the vehicle that leads to a macro-slip of the belt 15 takes place for some reason, the correlation coefficient S starts decreasing to some extent. When a macro-slip subsequently starts, the correlation coefficient S starts decreasing rapidly. For example, the reference values S1 and S2 are respectively set to the values as indicated in FIG. 2.

In the meantime, the correlation coefficient S is determined based on the input-shaft and output-shaft rotation speeds. The relationship between these rotation speeds change not only due to slippage of the belt 15 but also due to changes in the engine torque, acceleration/deceleration of the vehicle, and the like, which are caused when the accelerator operation amount changes. While the correlation coefficient S may decrease due to these changes, such a decrease in the correlation coefficient S does not indicate an occurrence or a possibility of a macro-slip. In this case, therefore, there is a need to avoid making the macro-slip determination. To meet this need, each of the reference values S1 and S2 may be changed in accordance with the operating conditions of the vehicle, such as the rate of change of the accelerator operation amount, acceleration/deceleration of the vehicle, and so on.

Figure 3:
FIG. 3 is a graph schematically showing the trend or tendency of changes of reference values in accordance with the operating conditions of the vehicle.

FIG. 3 is a graph showing one example of the tendency of changes in the reference values S1, S2. As shown in FIG. 3, the respective reference values S1, S2 are reduced as the rate of change of the accelerator operation amount ΔACC or the acceleration/deceleration ΔV increases. Thus, if the correlation coefficient S decreases due to a factor or factors other than a macro-slip, an occurrence or a possibility of a macro-slip will not be determined by mistake, and a responsive control will not be performed by mistake in response to the decrease in the correlation coefficient S. Thus, erroneous determination of a macro-slip is avoided, and unnecessary responsive control can also be avoided or suppressed. Furthermore, a delay in determining an occurrence or a possibility of slippage is prevented.

Figure 4:
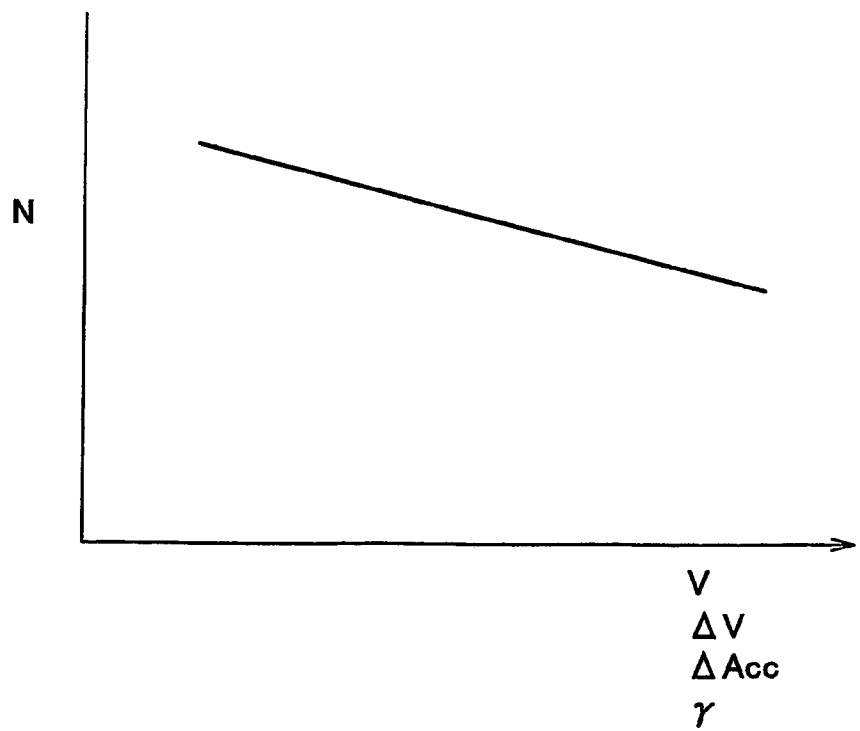
FIG. 4 is a graph schematically showing the trend or tendency of changes of the number of sampling points for obtaining the correlation coefficient in accordance with the operating conditions of the vehicle.

Also, the correlation coefficient S is calculated using a plurality of detection values representing the input and output rotation speeds. The number of sets of the detected values (which will be referred to as "set number") is preferably determined in accordance with the operating state of the vehicle. FIG. 4 is a graph schematically showing one example of the tendency or trend in determining the set number N. As shown in FIG. 4, the set number N is reduced as the vehicle speed V, the acceleration/deceleration ΔV, the rate of change in the accelerator operation amount ΔACC, the gear ratio γ, or the like, increases. When the rate of change of the accelerator operation amount is large, for example, the degree or magnitude of a corresponding change in the gear ratio is supposed to be large. In this case, the set number is reduced in order to prevent the correlation coefficient S from being calculated based on the rotation speeds at largely different gear ratios and thereby prevent erroneous determination of a macro-slip and a delay in determining an occurrence or a possibility of slippage of the belt 15.

As described above, the slippage detection system of the embodiment is arranged to determine macro-slips based on the correlation coefficient by measuring the input and output rotation speeds by means of the sensors 21, 22 that are normally used for determining the gear ratio of the CVT 1. With this arrangement, slippage of the belt 15 can be immediately determined with sufficiently high accuracy without using other sensor or sensors dedicated to this function. Moreover, since the slippage detection system is able to carry out necessary responsive control based on the determination of macro-slips, a damage to the CVT 1 as a result of excessive slippage of the belt 15 can be prevented or suppressed.

Meanwhile, the input-shaft rotation speed Nin of the CVT 1 changes due to various factors, such as the gear ratio control, slippage of the belt 15, or periodical variations in the input torque. Therefore, by determining the amount of change of the input rotation speed that is caused by slippage of the belt 15, out of the overall change amount, it is possible to determine an occurrence or a possibility of a macro-slip of the belt 15 based on the determined value (change amount). One example of such control will be described in the following.

Figure 5:
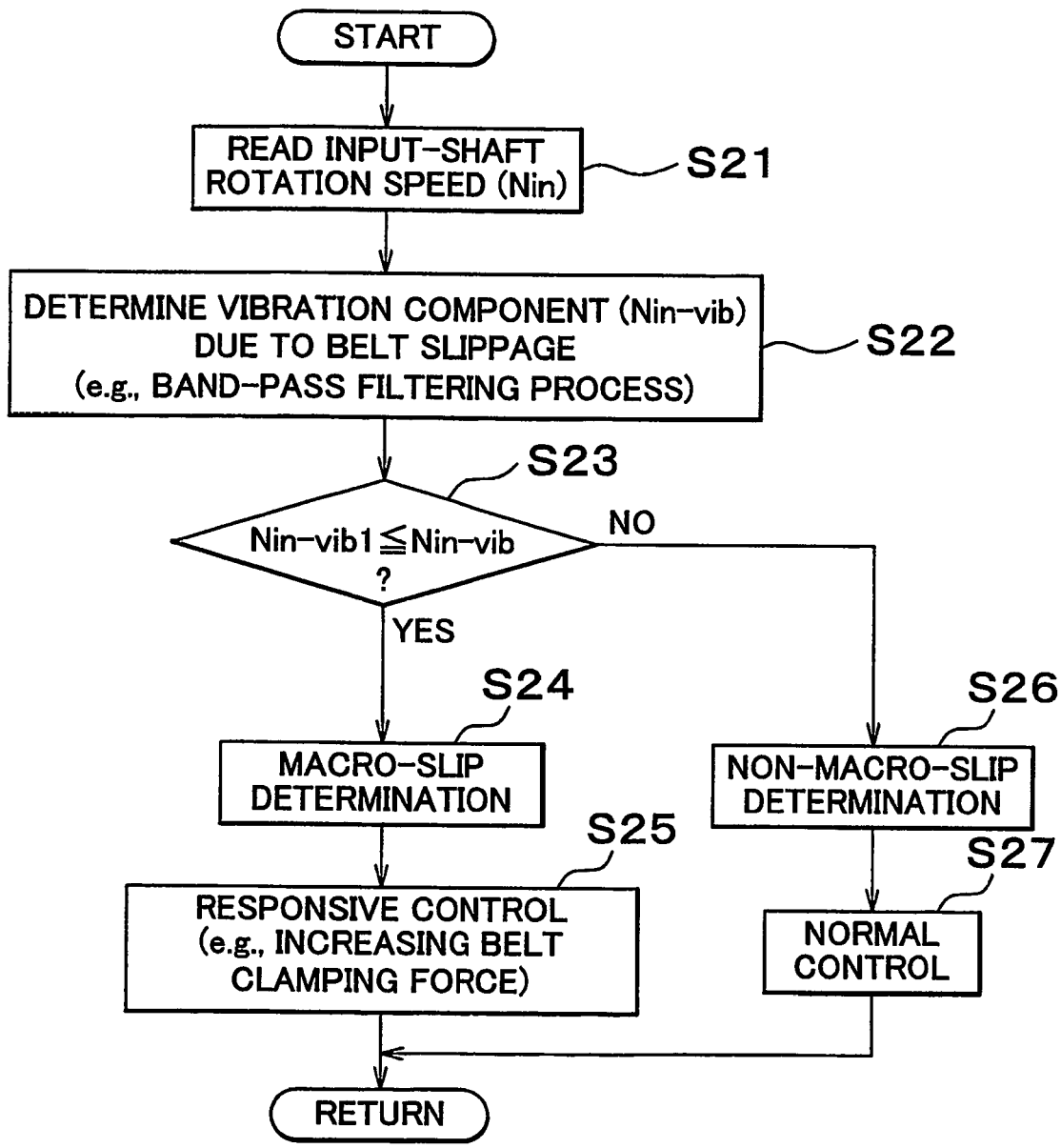
FIG. 5 is a flowchart for explaining another example of control performed by the slippage detection system according to the invention.

FIG. 5 is a flowchart showing one example of the control. In this control, the input-shaft rotation speed Nin detected by the input rotation speed sensor 20 is first read in step S21. Next, a vibration component Nin·vib contained in the input-shaft rotation speed Nin and resulting from slippage of the belt 15 is obtained. Here, the vibration component Nin·vib can be obtained, for example, by carrying out a band-pass filtering process or on the basis of a deviation of the actual input-shaft rotation speed Nin from a command value of the input-shaft rotation speed. The command value is determined so as to achieve the desired gear ratio. During the band-pass filtering process, measurement noises are also removed.

Figure 6:
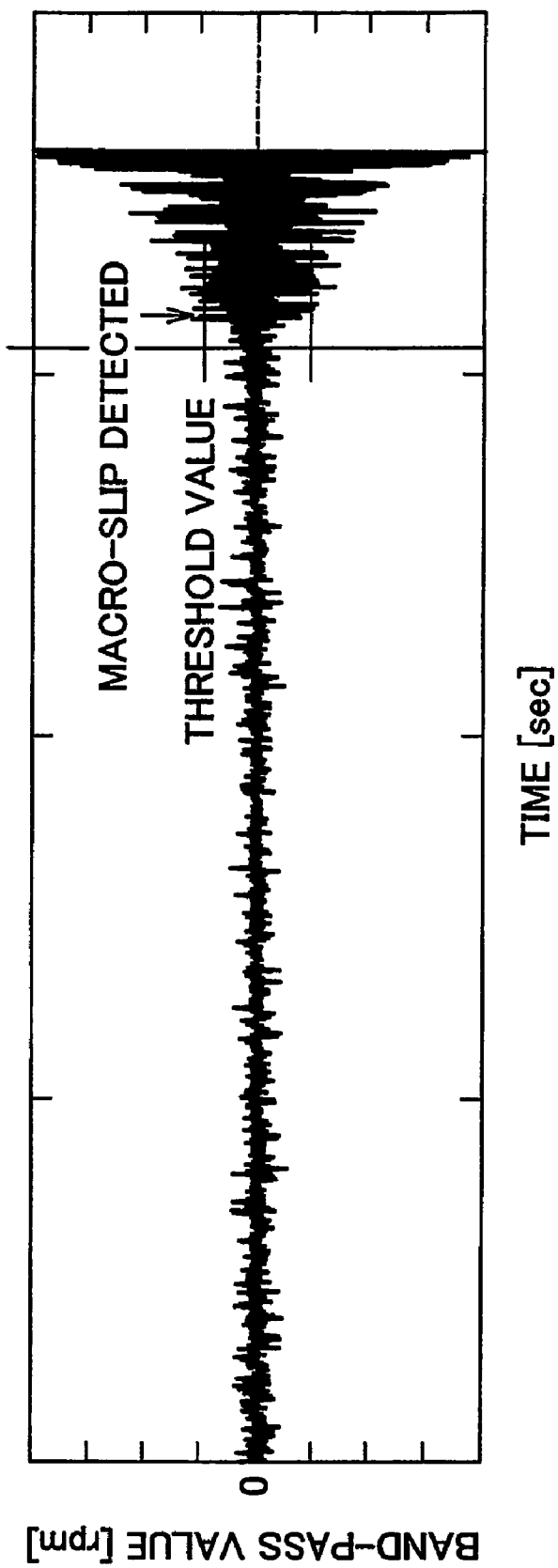
FIG. 6 is a graph showing changes in a band-pass value obtained by subjecting an input-shaft rotation speed to a filtering process.

FIG. 6 is a graph showing one example of changes in the band-pass value with time when the input-shaft rotation speed Nin is subjected to band-pass filtering (20-30 Hz). When a macro-slip does not occur as shown in FIG. 6, the band-pass value stays in a relatively small range. When a macro-slip takes place, on the other hand, the band-pass value rapidly increases. In view of this, a reference value Nin·vib1 is determined in advance as an index or criteria for determining an occurrence of a macro-slip, and it is determined in step S23 whether the vibration component Nin·vib obtained in step S22 is equal to or larger than the reference value Nin·vib1. Meanwhile, the reference value Nin·vib1 may be changed in accordance with the operating state of the vehicle, rather than being constant, so as to prevent erroneous determinations from being made and also avoid a delay in determining an occurrence of a macro-slip.

If the vibration component Nin·vib is equal to or larger than the reference value Nin·vib1 and a positive determination is therefore made in step S23, the macro-slip determination is made in step S24, and a responsive control is performed in step S25. The operations in step S24 and step S25 are the same as or equivalent to those in step S8 and step S9 of FIG. 1, respectively.

If the vibration component Nin·vib is smaller than the reference value Nin·vib1 and a negative determination is therefore made in step S23, it indicates that a macro-slip is not occurring as is understood from FIG. 6. In this case, a non-macro-slip determination is made in step S26. Subsequently, normal control is performed in step S27. In this normal control, the belt clamping force is set in accordance with, for example, the engine torque or the amount of depression of the accelerator pedal (i.e., accelerator operation amount).

In order to perform the control as illustrated above with reference to FIGS. 5 and 6, the slippage detection system of the embodiment uses only the input rotation speed sensor 20 as a sensor so as to immediately and accurately determine macro-slips of the belt 15 without requiring other sensor or sensors for this purpose. Moreover, since the slippage detection system is able to perform required responsive control upon detection of a macro-slip, an otherwise possible damage to the CVT 1 as a result of excessive slippage of the belt 15 can be prevented.

While an occurrence of a macro-slip is determined based on the band-pass values in the control illustrated in FIG. 5, the slippage detection system according to another embodiment of the invention is constructed so as to determine an occurrence of a macro-slip based on the accumulated value of the vibration components due to slippage of the belt during a period from a previous point of time to the current point of time. One example of such control will be described in the following.

Figure 7:
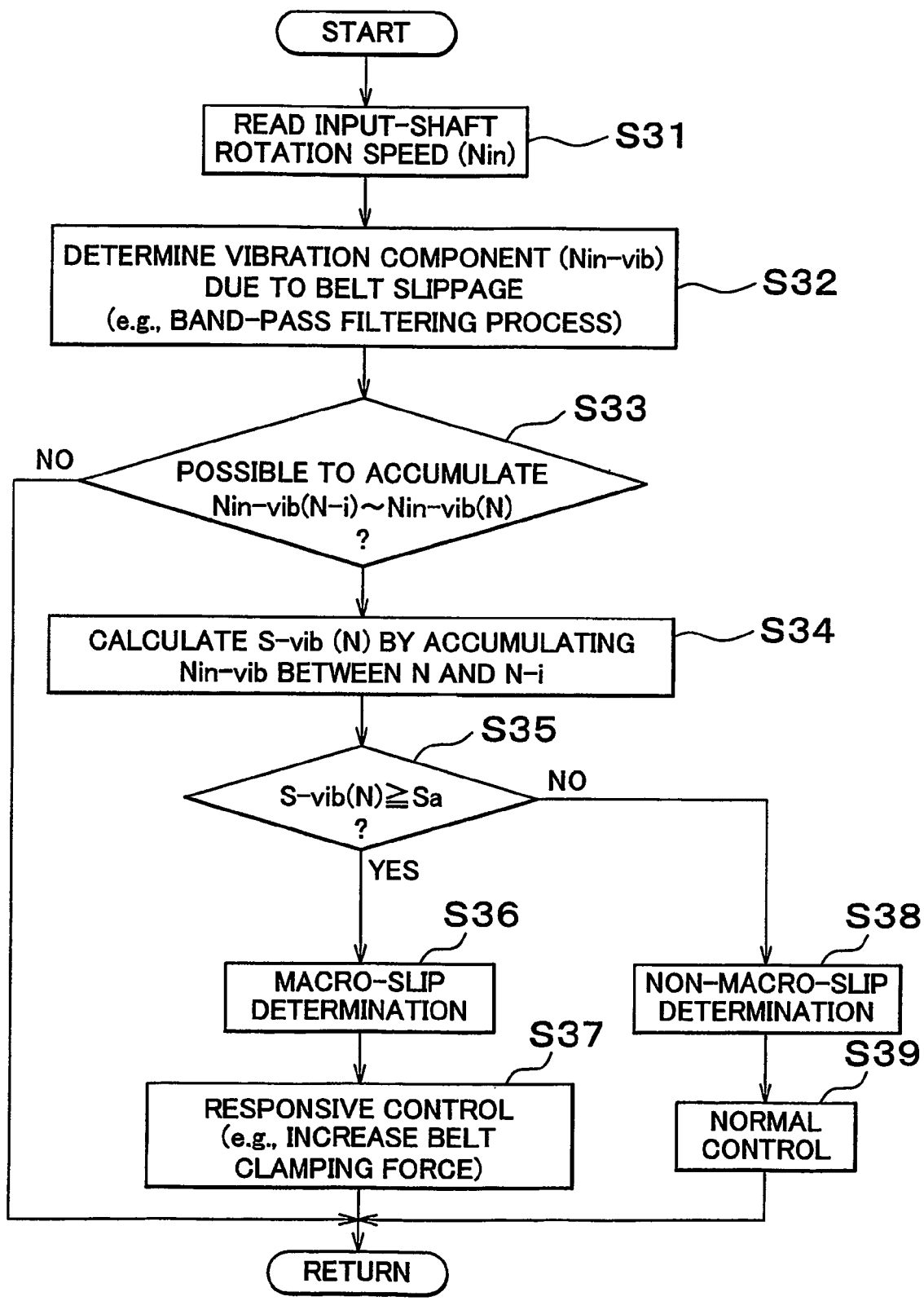
FIG. 7 is a flowchart for explaining another example of control performed by the slippage detection system according to the invention.

In this control, as shown in FIG. 7, the input-shaft rotation speed Nin is read in step S31 and the vibration component Nin·vib is determined in step S32 in the same manner as in steps S21 and step S22 of FIG. 5, respectively. Subsequently, it is determined in step S33 whether it is possible to carry out accumulation of the vibration components Nin·vib. More specifically, it is determined in step S33 whether i sets of data required for executing a time-window accumulation of the vibration components have been obtained.

If a negative determination is made in step S33, the control returns, and waits for a required number of data sets to be obtained. If a positive determination is made in step S33, conversely, step S34 is executed to calculate a time-window accumulation value S–vib (N) of the vibration components obtained during a period between the present time (N time point) and a previous point of time (N-1 time point) that is a predetermined time prior to the present time. Here, the number of data sets to be accumulated or the time period during which the data are accumulated may be changed depending upon the operating state of the vehicle.

Figure 8:
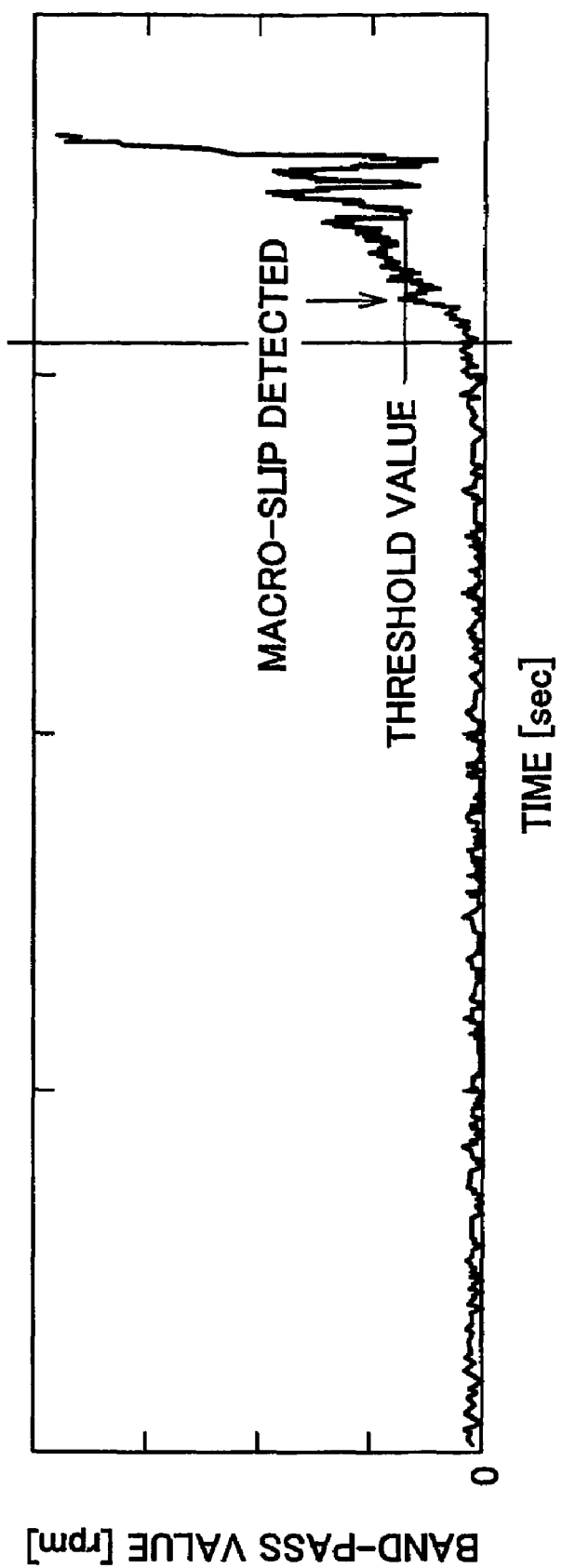
FIG. 8 is a graph showing changes in the accumulated band-pass value.

FIG. 8 is a graph showing changes in the time-window accumulation value of the vibration components Nin–vib resulting from slippage of the belt 15. When a macro-slip does not occur, the accumulated band-pass value S–vib(N) is held within a relatively small range, as shown in FIG. 8. When a macro-slip occurs, on the other hand, the accumulated band-pass value S–vib(N) increases rapidly. In view of this, a reference value Sa, which is used as a criteria or threshold for determining an occurrence of a macro-slip, is set in advance, and it is determined in step S35 whether the accumulated band-pass value S–vib(N) obtained in step S34 is equal to or larger than the reference value Sa. Meanwhile, the reference value Sa may be changed in accordance with the operating state of the vehicle, rather than being constant, so as to prevent an erroneous determination of a macro-slip and also avoid a delay in determining an occurrence of a macro-slip.

If the accumulated band-pass value S–vib(N) is equal to or larger than the reference value Sa and a positive determination is made in step S35, the macro-slip determination is made in step S36 and a responsive control is then performed in step S37. These operations in steps S36 and S37 are the same as or equivalent to those in step S24 and step S25 of FIG. 5, or those in step S8 and step S9 of FIG. 1, respectively.

If the accumulated band-pass value S–vib(N) is smaller than the reference value Sa and a negative determination is made in step S35, on the other hand, it indicates that a macro-slip is not occurring as is understood from FIG. 8. In this case, therefore, a non-macro-slip determination is made in step S38. Subsequently, normal control is performed in step S37. These operations in step S38 and step S39 are the same as or equivalent to those in step S26 and step S27 of FIG. 5, respectively.

In order to perform the control as illustrated above with reference to FIGS. 7 and 8, the slippage detection system of the embodiment uses only the input rotation speed sensor 20 as a sensor to immediately and accurately determine macro-slips of the belt 15 without requiring other sensor or sensors for this purpose. Moreover, since the slippage detection system is able to perform required responsive control upon detection of a macro-slip, an otherwise possible damage to the CVT 1 as a result of excessive slippage of the belt 15 can be prevented.

As described above, slipping of the belt 15 causes changes in the input and output rotation speeds. With the rotation speeds thus changed, the actual gear ratio, which is obtained as a ratio between the input-shaft rotation speed and the output-shaft rotation speed, deviates from a gear ratio (i.e., a target gear ratio) established immediately before the occurrence of slippage of the belt 15, resulting in a difference between the actual gear ratio and the target gear ratio. According to another embodiment of the invention, an occurrence of a macro-slip is determined on the basis of the above-described difference between the actual gear ratio and the target gear ratio.

Figure 9:
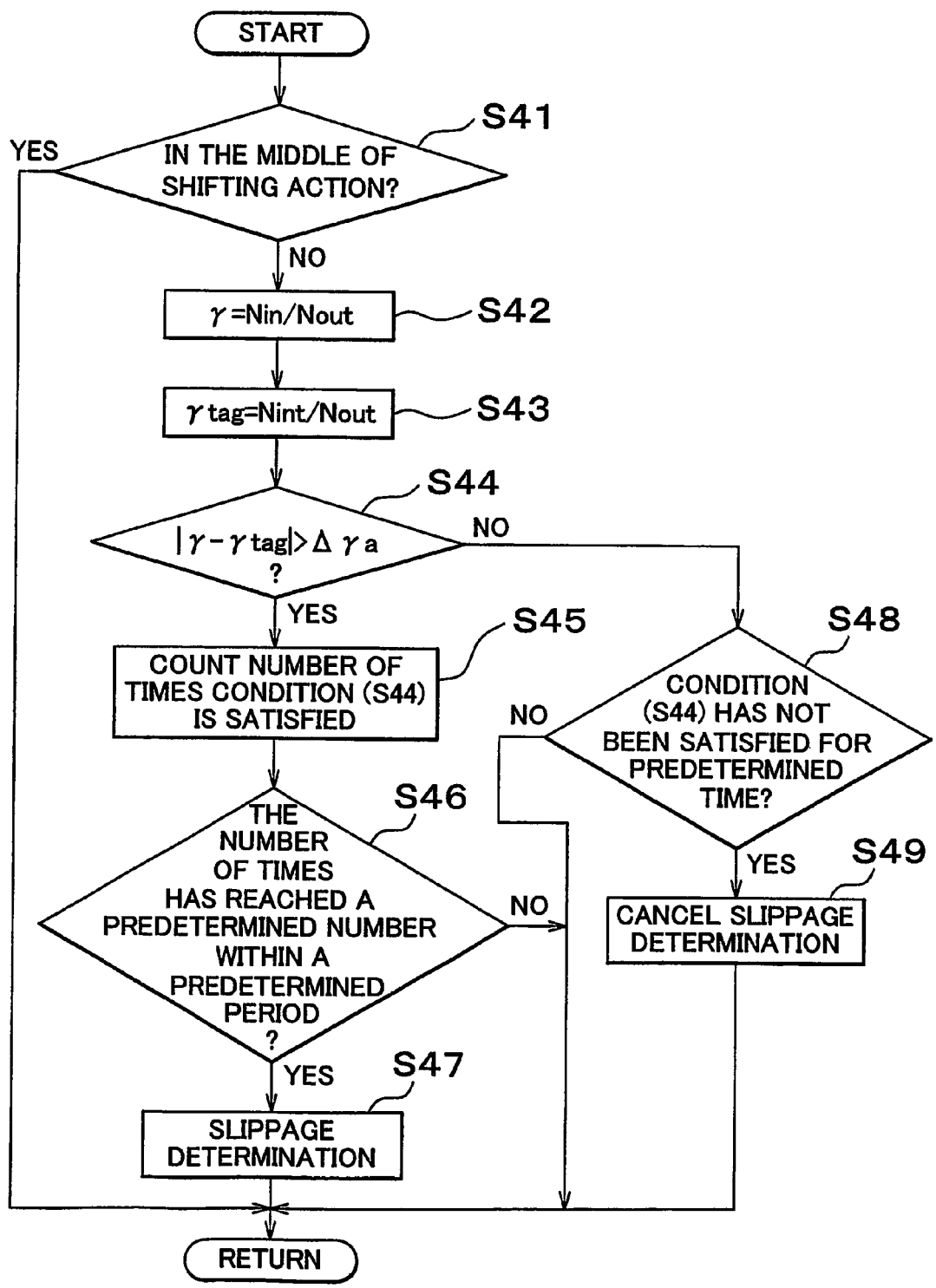
FIG. 9 is a flowchart for explaining another example of control performed by the slippage detection system according to the invention.

FIG. 9 is a flowchart showing one example of control for determining a macro-slip in the above-described manner. In this control, it is first determined in step S41 whether the gear ratio is being changed, namely, the CVT 1 is in the middle of a shifting action. The target gear ratio is generally set on the basis of the output requirement (e.g., accelerator operation amount) and the vehicle speed or engine speed, for example. When the CVT 1 is in the middle of a shifting action, however, the target gear ratio or the target input rotation speed corresponding to the target gear ratio may be set as a value with a first-order lag with respect to a finally set value. Accordingly, the varying target gear ratio cannot be used as a basis for determining an occurrence or a possibility of slippage of the belt 15. Accordingly, in step S41, it is determined whether the CVT 1 is in the middle of a shifting action, and if a positive determination is made in step S41, the control returns without performing any particular control.

If the CVT 1 is not in the middle of a shifting action and a negative determination is made in step S41, the actual gear ratio $\gamma$ is calculated in step S42 as a ratio between the input rotation speed Nin and the output rotation speed Nout, both obtained through actual measurements. Subsequently, a target gear ratio $\gamma$tag is calculated in step S43 as a ratio between the target input rotation speed Nint and the output rotation speed Nout obtained through an actual measurement. Then, it is determined in step S44 whether an absolute value of a difference between the actual gear ratio $\gamma$ and the target gear ratio $\gamma$tag is larger than a reference value $\Delta\gamma$a that has been determined in advance.

Figure 10:
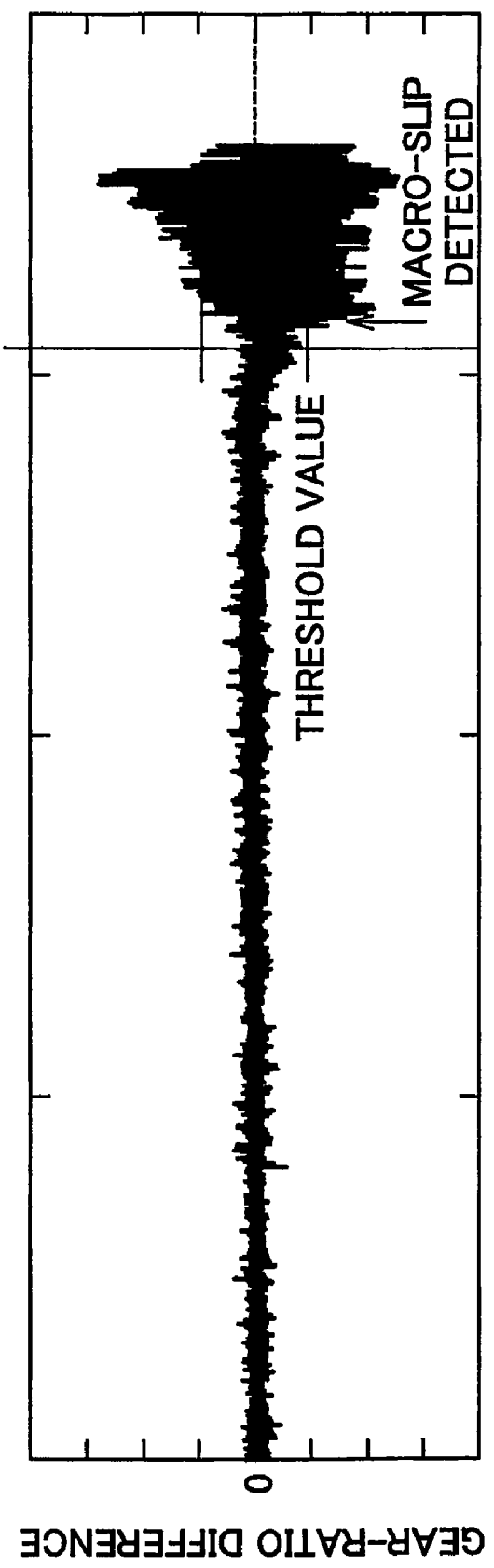
FIG. 10 is a graph showing changes in a difference between an actual gear ratio and a target gear ratio of a CVT.

FIG. 10 is a graph showing one example of a situation where the difference between the actual gear ratio $\gamma$ and the target gear ratio $\gamma$tag changes. Since the input rotation speed changes due to various factors while the CVT 1 is being operated, as described above, the gear ratio difference between the actual and target gear ratios keeps varying slightly in the positive and negative directions with respect to zero as shown in FIG. 10. When a macro-slip is not occurring, the gear ratio difference is maintained in a small range. When a macro-slip occurs, however, the input rotation speed starts deviating largely from the target value, resulting in an increase in the gear ratio difference. Accordingly, it is possible to determine an occurrence or a possibility of a macro-slip by determining whether the gear ratio difference is smaller or larger than a threshold value established for determination of macro-slips.

More specifically, in the example as illustrated in FIG. 9, the number of times the gear ratio difference exceeds the reference value $\Delta\gamma$a is counted in step S45. Subsequently, it is determined in step S46 whether the above number of times the above condition ($|\gamma-\gamma\text{tag}|>\Delta\gamma$a) of step S44 is satisfied has reached a predetermined number within a predetermined period of time. This determination is made so as to prevent an erroneous determination due to disturbances such as noise.

If a positive determination is made in step S46, an occurrence or a possibility of slippage, or a macro-slip, of the belt 15 is determined in step S47. In this case, the slippage detection system performs a control in response to the detected macro-slip, such as increasing the belt clamping force or reducing the engine torque, as in the respective examples of control as described above. If a negative determination is made in step S46, conversely, the control returns.

On the other hand, if the gear ratio difference is equal to or smaller than the reference value $\Delta\gamma$a and a negative determination is made in step S44, it is then determined in step S48 whether this state has lasted for a predetermined period of time. If a negative determination is made in step S48, the control returns, thus waiting for time to pass. When a positive determination is made in step S48, on the other hand, it indicates that the actual gear ratio $\gamma$ is not largely different from the target gear ratio $\gamma$tag and this situation has lasted for the predetermined period. In this case, the slippage determination is canceled in step S49.

In order to perform the control as illustrated above with reference to FIG. 9, the slippage detection system of the embodiment uses only the input rotation speed sensor as a sensor to immediately and accurately determine macro-slips of the belt 15 without requiring other sensor or sensors for this purpose. Moreover, since the slippage detection system is able to perform required responsive control upon detection of a macro-slip, an otherwise possible damage to the CVT 1 as a result of excessive slippage of the belt 15 can be prevented.

Figure 11:
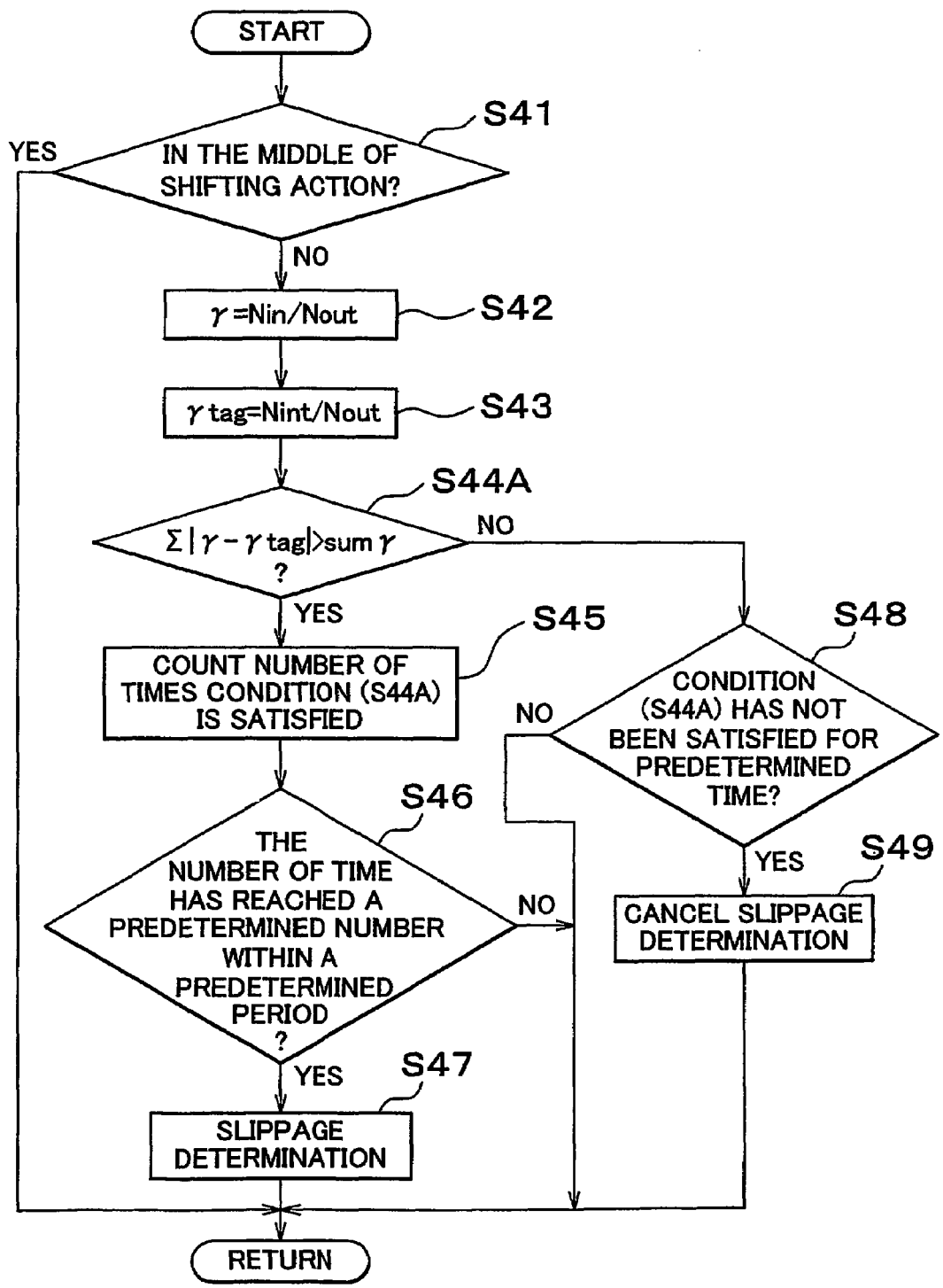
FIG. 11 is another flowchart obtained by partially modifying the flowchart of FIG. 9.

In the control as illustrated in FIG. 9, the number of times the gear ratio difference exceeds the reference value $\Delta\gamma a$ is counted for determining an occurrence or a possibility of slippage as described above. Instead, the sum of gear ratio differences that have been accumulated for a predetermined period of time or at a predetermined number of sampling points may be used for determining an occurrence or a possibility of slippage. More specifically, the number of times the sum of the gear ratio differences accumulated as described above exceeds a predetermined reference value sum$\gamma$ is counted. If the number of times has reached a predetermined number within a predetermined period, it is determined that slippage is occurring. FIG. 11 is a flowchart showing one example of control for determining an occurrence or a possibility of a macro-slip in such a manner. The operations in respective steps of the flowchart illustrated in FIG. 11 are the same as those in the flowchart illustrated in FIG. 9 except that step S44 of FIG. 9 is replaced by step S44A of FIG. 11. Meanwhile, the reference value sum$\gamma$ may be changed in accordance with the operating state of the vehicle, rather than being constant, so as to prevent an erroneous determination or a delay in determining an occurrence or a possibility of a macro-slip.

Figure 12:
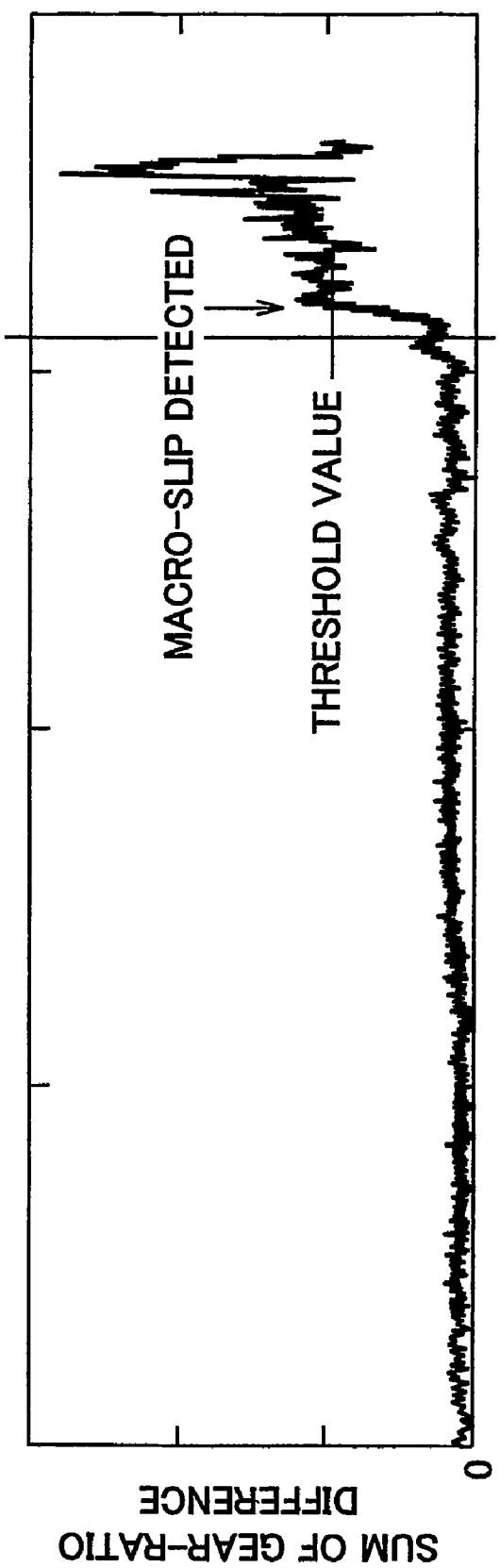
FIG. 12 is a view showing changes in the sum of the differences.

FIG. 12 is a graph showing changes in the sum of the gear ratio differences that are added up with respect to a predetermined number of (e.g., ten) sampling points shown in FIG. 10. As is apparent from FIG. 12, when a macro-slip does not occur, the sum of the gear ratio differences is maintained at relatively small values. When a macro-slip occurs, on the other hand, the sum begins to increase rapidly. Accordingly, it is possible to determine an occurrence or a possibility of a macro-slip when the sum exceeds a predetermined threshold value. Alternatively, it is also possible to determine an occurrence or a possibility of a macro-slip based on the number of times the sum exceeds the reference value sum$\gamma$, rather than merely comparing the sum with the threshold value, so that an erroneous determination due to some type of disturbance can be prevented or avoided.

In order to perform the control as illustrated above with reference to FIG. 11, the slippage detection system of the embodiment uses only the input rotation speed sensor 20 as a sensor to immediately and accurately determine macro-slips of the belt 15 without requiring other sensor or sensors for this purpose. Moreover, since the slippage detection system is able to perform required responsive control upon detection of a macro-slip, an otherwise possible damage to the CVT 1 as a result of excessive slippage of the belt 15 can be prevented.

As is apparent from FIG. 10 or 12 showing changes in the gear ratio difference or the sum of gear ratio differences, once the belt 15 starts slipping (i.e., a macro-slip appears), these values continue to increase progressively, and are maintained at large values until, for example, the CVT 1 breaks and stops operating, or the belt clamping force is extremely increased, or the engine torque is extremely reduced. Accordingly, an occurrence or a possibility of a macro-slip may be determined based on a time duration for which the sum of gear ratio differences is kept larger than the reference value sum$\gamma$, instead of counting the number of times the sum exceeds the reference value sum$\gamma$.

Figure 13:
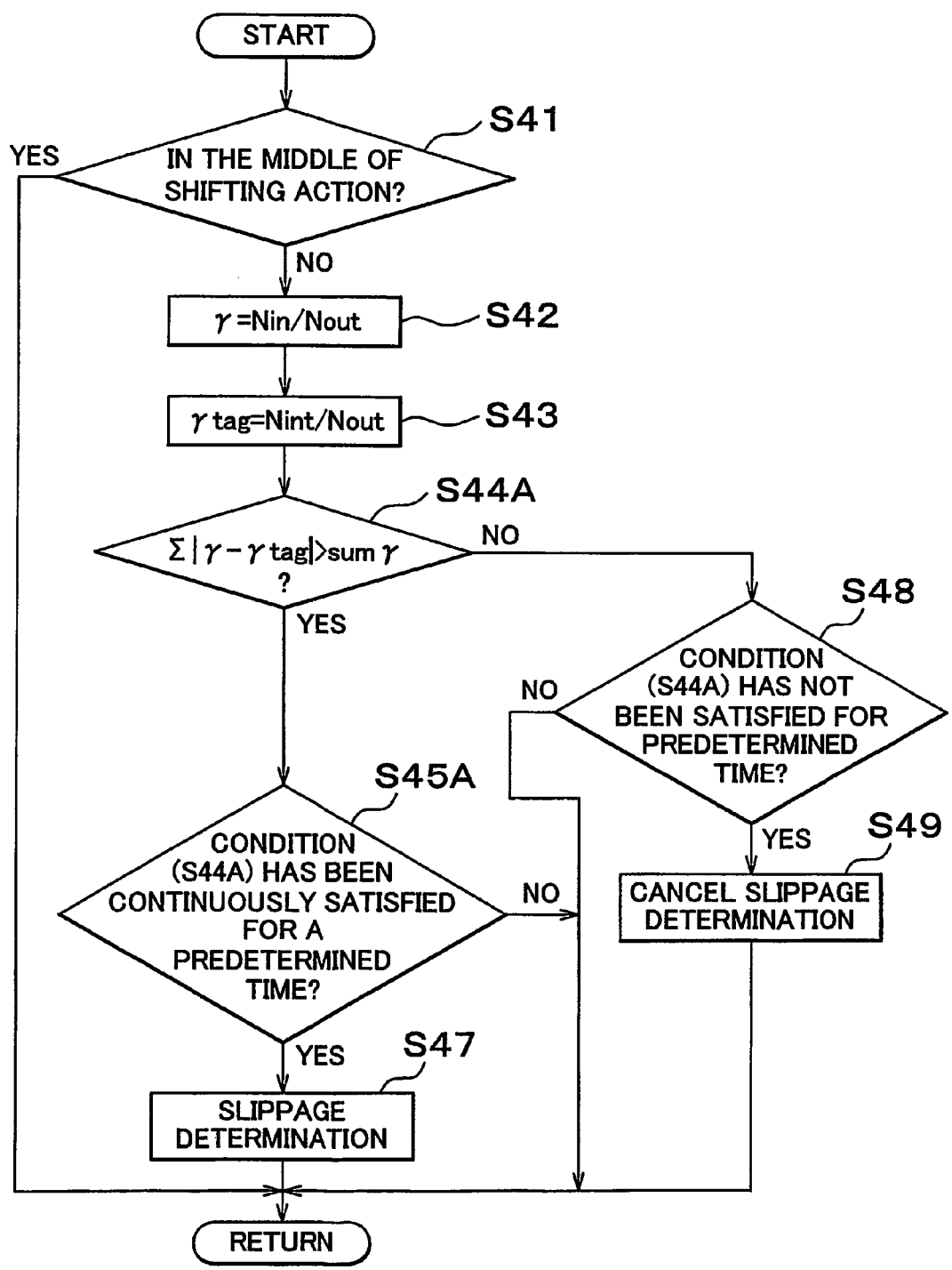
FIG. 13 is another flowchart obtained by partially modifying the flowchart of FIG. 11.

FIG. 13 is a flowchart showing one example of control for determining an occurrence or a possibility of a macro-slip in such a manner. The operations in respective steps of the flowchart illustrated in FIG. 13 are the same as those in the flowchart illustrated in FIG. 11, except that steps S45 and S46 in the flowchart of FIG. 11 are replaced by step S45A of the flowchart of FIG. 13. In step S45A, it is determined whether the condition determined in step S44A has been continuously satisfied for a predetermined period of time.

In order to perform the control as illustrated above, the slippage detection system of the embodiment uses only the input rotation speed sensor 20 as a sensor to immediately and accurately determine macro-slips of the belt 15 without requiring other sensor or sensors for this purpose, as in the case of control of FIG. 11. Moreover, since the slippage detection system is able to perform required responsive control upon detection of a macro-slip, an otherwise possible damage to the CVT 1 as a result of excessive slippage of the belt 15 can be prevented.

While the determination of belt slippage (macro-slip) is not performed during a shifting action of the CVT 1 in the control routines as illustrated in FIGS. 9, 11, and 13, the slippage detection system may be constructed so as to perform the determination of belt slippage even when the CVT 1 is in the middle of a shifting action. In this case, however, the target input rotation speed is set to a large value and the difference between the actual gear ratio and the target gear ratio becomes large, which may result in a deterioration in the accuracy in determining belt slippage. When performing the determination of belt slippage by using the gear ratio difference during a shifting action of the CVT 1, therefore, it is preferable to subject the target input rotation speed to a smoothing operation, and calculate the gear ratio difference using a target gear ratio determined based on the smoothened target input rotation speed. In this manner, an erroneous determination on an occurrence or a possibility of a macro-slip can be suppressed or avoided.

While the slippage detection systems of the illustrated embodiments of the invention are adapted for use in belt-type CVTs, the invention may be applied to slippage detection systems for use in toroidal-type (traction-type) continuously variable transmissions. Furthermore, the input rotation speed is not limited to the rotation speed of the input shaft. More specifically, the input rotation speed may be defined as the rotation speed of any member of the continuously variable transmission that is arranged to rotate by receiving torque from a power source, or the rotation speed of any member provided as a unit with that member. In the same way, the output rotation speed is not limited to the rotation speed of the output shaft. More specifically, the output rotation speed may be defined as the rotation speed of any member of the continuously variable transmission that is arranged to rotate with torque transmitted from an input-side member or the rotation speed of any member provided as a unit with that member. Still further, the slippage detection system according to the invention may be constructed so as to perform a plurality of the above-described slippage determination controls in combination.

The invention claimed is:

1. A slippage detection system for a continuously variable transmission capable of continuously changing a ratio between an input rotation speed of an input member and an output rotation speed of an output member, comprising:

a correlation coefficient calculator configured to calculate a correlation coefficient relating to the input rotation speed and the output rotation speed, based on a plurality of measurement values of the input rotation speed and a plurality of measurement values of the output rotation speed; and a slippage determining portion configured to determine slippage in the continuously variable transmission based on the correlation coefficient calculated by the correlation coefficient calculator, wherein the slippage determining portion determines slippage in the continuously variable transmission when the correlation coefficient calculated by the correlation coefficient calculator is smaller than a predetermined reference value, wherein the slippage determining portion sets the reference value based on an operating state of a vehicle in which the continuously variable transmission is installed, and wherein the reference value set by the slippage determining portion decreases as at least one of a rate of change of an accelerator operation amount and a rate of change of a vehicle speed increases.

2. A slippage detection system for a continuously variable transmission capable of continuously changing a ratio between an input rotation speed of an input member and an output rotation speed of an output member, comprising:

a correlation coefficient calculator configured to calculate a correlation coefficient relating to the input rotation speed and the output rotation speed, based on a plurality of measurement values of the input rotation speed and a plurality of measurement values of the output rotation speed; and a slippage determining portion configured to determine slippage in the continuously variable transmission based on the correlation coefficient calculated by the correlation coefficient calculator, wherein the correlation coefficient calculator sets the number of the measurement values of each of the input rotation speed and the output rotation speed used for calculating the correlation coefficient, based on an operating state of a vehicle in which the continuously variable transmission is installed, and wherein the number of the measurement values set by the correlation coefficient calculator decreases as at least one of a vehicle speed, a rate of change of the vehicle speed, a rate of change of an accelerator operation amount and the gear ratio increases.

3. A method of detecting slippage in a continuously variable transmission capable of continuously changing a ratio between an input rotation speed of an input member and an output rotation speed of an output member, comprising the steps of:

calculating a correlation coefficient relating to the input rotation speed and the output rotation speed, based on a plurality of measurement values of the input rotation speed and a plurality of measurement values of the output rotation speed; and determining slippage in the continuously variable transmission based on the correlation coefficient, wherein slippage is determined when the correlation coefficient is smaller than a predetermined reference value, wherein the reference value is set based on an operating state of a vehicle in which the continuously variable transmission is installed, and wherein the reference value decreases as at least one of a rate of change of an accelerator operation amount and a rate of change of a vehicle speed increases.

4. A method of detecting slippage in a continuously variable transmission capable of continuously changing a ratio between an input rotation speed of an input member and an output rotation speed of an output member, comprising the steps of:

calculating a correlation coefficient relating to the input rotation speed and the output rotation speed, based on a plurality of measurement values of the input rotation speed and a plurality of measurement values of the output rotation speed; and determining slippage in the continuously variable transmission based on the correlation coefficient, wherein the number of the measurement values of each of the input rotation speed and the output rotation speed used for calculating the correlation coefficient is set based on an operating state of a vehicle in which the continuously variable transmission is installed, and wherein the number of the measurement values decreases as at least one of a vehicle speed, a rate of change of the vehicle speed, a rate of change of an accelerator operation amount and the gear ratio increases.

* * * * *

UNITED STATES PATENT AND TRADEMARK OFFICE
CERTIFICATE OF CORRECTION

| | | |
|---|---|---|
| PATENT NO. | : 7,806,790 B2 | Page 1 of 1 |
| APPLICATION NO. | : 10/491042 | |
| DATED | : October 5, 2010 | |
| INVENTOR(S) | : Kunihiro Iwatsuki et al. | |

It is certified that error appears in the above-identified patent and that said Letters Patent is hereby corrected as shown below:

On the title page, Item (86), the Application Filing Date is incorrect. Item (86) should read:

-- (86) PCT No.:   PCT/IB02/04001

§ 371 (c)(1),
(2), (4) Date:   Aug. 11, 2004 --

Signed and Sealed this
Eleventh Day of January, 2011

David J. Kappos
*Director of the United States Patent and Trademark Office*